Patented Mar. 3, 1925.

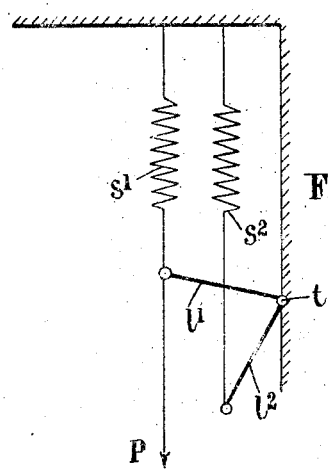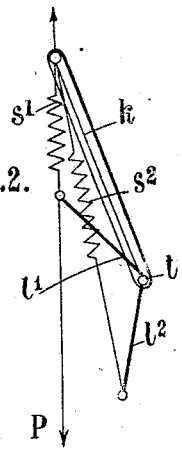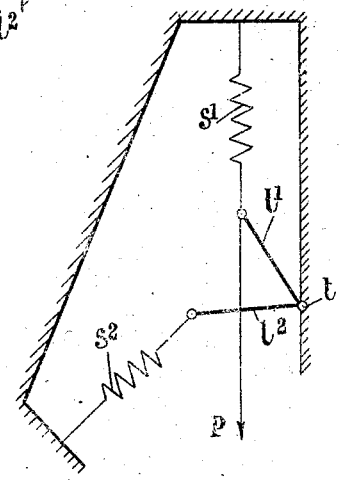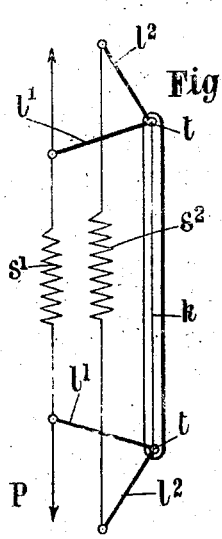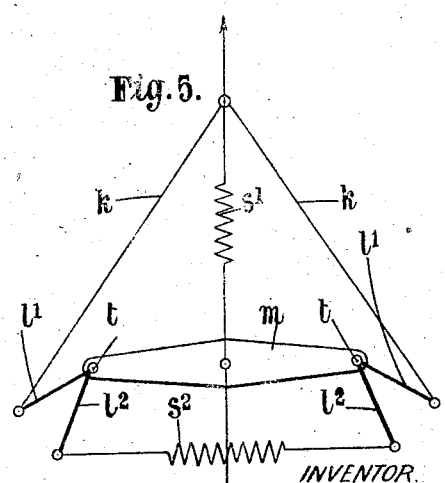

1,528,613

UNITED STATES PATENT OFFICE.

GEOFFREY TERENCE ROLAND HILL, OF LONDON, ENGLAND.

SPRING MECHANISM.

Application filed September 19, 1922. Serial No. 589,280.

*To all whom it may concern:*

Be it known that GEOFFREY TERENCE ROLAND HILL, a British subject, residing at 39 West Heath Drive, London, NW. 11, England, has invented certain new and useful Improvements in Spring Mechanism, of which the following is a specification.

This invention relates to spring mechanism and has for its object to provide a mechanism in which the force required to stretch the mechanism is very small compared with the stiffness of the primary spring stretched in the mechanism or substantially constant throughout the major portion of the range of its movement or in which the change of force for unit displacement has a predetermined value at any displacement which cannot be obtained with the use of a single spring.

The ordinary spring mechanism possesses the property that the restoring force is proportional to the deflection of the spring, but in many mechanisms in which it is desirable to employ springs it is preferable that properties of the mechanism be modified so as to provide a restoring force that is substantially constant throughout the major portion of its movement or varies in a predetermined manner differing fundamentally from that obtained with the ordinary spring.

In the mechanism constructed in accordance with this invention two springs or sets of springs are employed, one of which I call the "primary" spring and is directly acted upon by the external force and the other the "secondary" spring which is acted upon through a crank or kinematically equivalent mechanism, the arrangement of the springs and crank or the like being such that the force transmitted by the mechanism is not transmitted wholly through either spring but is divided between the two springs, and the force transmitted through the secondary spring decreases as that transmitted through the primary spring increases through the major portion of the movement of the mechanism.

The invention is to be distinguished from the known forms of mechanism in which the force acting first through one spring then acts upon a second spring through a crank or kinematically equivalent mechanism; in this mechanism the whole force is transmitted through each spring whereas in the mechanism of the present invention it is divided between them.

In the accompanying drawings which illustrate in diagrammatic manner a number of alternative mechanisms embodying the present invention—

Fig. 1 represents a construction in which the springs are parallel and one is acted upon through a bell-crank lever.

Fig. 2 represents a simplified form employing the bell-crank lever but with the springs slightly inclined.

Fig. 3 represents a further modification employing a bell-crank lever.

Fig. 4 represents a duplex modification of the form shown in Fig. 1 to eliminate obliquity errors where exact linear variation of force is required.

Fig. 5 represents a further modification employing duplex bell-cranks.

In each of these representations the primary spring is designated by the reference $S^1$ and the secondary spring by the reference $S^2$ and the springs and the cranks are represented as being substantially co-planar but it is to be understood that the springs may be in different planes and that the cranks may be mounted at appropriate distances apart on shafts.

In the form shown in Figure 1 the springs $S^1$, $S^2$ are parallel and are connected respectively to cranks $l^1$, $l^2$ mounted upon a shaft $t$ at substantially ninety degrees apart.

The external force P is applied to the crank $l_1$ and neglecting obliquity errors, it results that when the spring $S^2$ is unloaded and when the crank $l^2$ is at right angles to it the force required to move this crank against the resistance of the secondary spring alone varies uniformly with the displacement from a maximum at zero displacement to zero at half displacement and then to a numerically equal maximum on the opposite direction at maximum displacement, the maximu value of this force when the cranks are of equal length being equal to the tension of the spring $S^2$ at its maximum displacement. The force required to move the primary spring is directly proportional to the extension so that the resultant force P, which is equal to the sum of the forces due to each spring separately, will be constant through the range of movement of the mechanism if the springs are of equal stiffness. By varying the stiffness of the springs or the lengths of the arms the resultant force may be caused to increase or to decrease steadily with displacement.

In the form shown in Fig. 2 the two springs are anchored to a link or equivalent member $k$ to which the shaft $t$ is pivoted; in other respects the mechanism is the same as that shown in Fig. 1. It is found that if the length of the link $k$ is twice the length of each arm of the bell-crank the angle of the bell-crank is 126° and the angle between the crank $l^1$ and the link $k$ is about 5 degrees on the side shown in the figure when the spring $S^2$ is unstressed; and the secondary spring is approximately five and one half times as stiff as the primary spring; then the mechanism gives a substantially constant tractive force over about one third of its total range of movement.

The secondary spring $S^2$ may be set at any convenient angle to the primary spring. In the form shown in Fig. 3 the angle is such that the spring $S^2$ functions both in tension and compression.

In the forms shown in Figs. 4 and 5 the secondary spring $S^2$ instead of being anchored at one end, is arranged so as to apply a torque to each of two shafts $t$.

The form shown in Fig. 4 may be regarded as the duplex form of that shown in Fig. 1 and the mechanism become free from errors due to obliquity of the springs with the movement of the bell-cranks. Two bell-cranks $l^1$, $l^2$ preferably exactly similar are provided and the two shafts $t$ are separated by a link $k$.

In the form shown in Fig. 5 the two springs are arranged at right angles to each other and the primary spring $S$ is anchored at one end to a rigid member $m$ which carries two shafts $t$ mounted upon which bell-cranks $l^1$, $l^2$ are mounted. The two ends of the spring $S^2$ are connected to the arms $l^2$ and the arms $l^1$ are connected by links $k$ with the other end of the primary spring $S^1$.

Any or all of the links or springs may be duplicated so as to clear each other when the mechanism moves; the characteristics of the two springs of a duplicated spring taken together would then be equal to the characteristics of the single spring which would be suitable and a duplicated spring is included hereinafter in the term "spring".

An advantage of these mechanisms is that they enable practically the whole of the energy which can be stored in the springs to be utilized.

The word "stretch" has been employed throughout the specification to save undue verbosity; it is to be understood that this word is to be taken to cover all methods of strain of which spring mechanisms are capable such as stretch, compression and axial twist.

I claim:—

1. In a spring mechanism, the combination of a primary spring directly acted upon by an external force, a secondary spring, a mechanical connection between the springs dividing between them the total force transmitted, said connection including two lever arms, one connected to each of said springs, the arrangement of the parts being such that at approximately mid-position in the movement of the primary spring the lever arm connected to the secondary spring is on dead center and the secondary spring at maximum strain.

2. In a spring mechanism, the combination of a primary tension spring directly extensible by the action of an external force, a secondary tension spring, and a bell crank having two lever arms, one in advance of the other, said secondary spring being connected to the arm which is in advance during loading and said primary spring being connected to the other arm.

3. In a spring mechanism, the combination of a primary spring directly acted upon by an external force, a secondary spring substantially parallel to said primary spring, a mechanical connection between the spring dividing between them the total force transmitted, said connection including two lever arms, one connected to each of said springs, the arrangement of the parts being such that at approximately mid-position in the movement of the primary spring the lever arm connected to the secondary spring is on dead center and the secondary spring at maximum strain.

4. In a spring mechanism, the combination of a primary spring directly acted upon by an external force, a secondary spring, a mechanical connection between the spring dividing between them the total force transmitted, said connection including two lever arms, one connected to each of said springs, the arrangement of the parts being such that at approximately mid-position in the movement of the primary spring the lever arm connected to the secondary spring is on dead center and the secondary spring at maximum strain, said springs being parallel to one another throughout the whole range of movement of the mechanism.

5. In a spring mechanism, the combination of a primary spring directly acted upon by an external force, a secondary spring, a mechanical connection between the springs dividing between them the total force transmitted, said connection including two lever arms, one connected to each of said springs, the arrangement of the parts being such that at approximately mid-position in the movement of the primary spring the lever arm connected to the secondary spring is on dead center and the secondary spring at maximum strain, said springs bearing to one another a fixed angular relationship throughout the movement of the mechanism.

6. In a spring mechanism, the combination of a rigid member, two bell crank levers pivoted to said member, a directly loaded primary spring connected to one arm of one of said levers and to one arm of the other of said levers, a secondary spring connected to the second arm of one of said levers and to the second arm of the other of said levers, said secondary spring being thereby constrained to bear a fixed angular relationship to said primary spring for all positions of said levers.

7. In a spring mechanism, the combination of a rigid member, two bell crank levers pivoted to said member, a directly loaded primary spring connected to one arm of one of said levers and to one arm of the other of said levers, a secondary spring connected to the second arm of one of said levers and to the second arm of the other of said levers, said springs being parallel to one another in all positions of said levers.

In testimony whereof I affix my signature.

GEOFFREY TERENCE ROLAND HILL.